United States Patent
Legemah et al.

(10) Patent No.: US 9,714,375 B2
(45) Date of Patent: Jul. 25, 2017

(54) DELAYED VISCOSITY WELL TREATMENT METHODS AND FLUIDS

(71) Applicant: BAKER HUGHES INCORPORATED, Houston, TX (US)

(72) Inventors: Magnus U. Legemah, Richmond, TX (US); Paul S. Carman, Spring, TX (US); Rupa Venugopal, Katy, TX (US); Hong Sun, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 417 days.

(21) Appl. No.: 13/973,756

(22) Filed: Aug. 22, 2013

(65) Prior Publication Data
US 2015/0053409 A1    Feb. 26, 2015

(51) Int. Cl.
| | | |
|---|---|---|
| *C09K 8/68* | (2006.01) | |
| *C09K 8/72* | (2006.01) | |
| *C09K 8/88* | (2006.01) | |
| *C09K 8/90* | (2006.01) | |

(52) U.S. Cl.
CPC .............. *C09K 8/685* (2013.01); *C09K 8/725* (2013.01); *C09K 8/887* (2013.01); *C09K 8/90* (2013.01)

(58) Field of Classification Search
CPC ...... C09K 8/03; C09K 2003/104; C09K 8/18; C09K 13/08; E21B 43/162
USPC ...................................... 166/308.5
See application file for complete search history.

(56) References Cited

U.S. PATENT DOCUMENTS

| | | |
|---|---|---|
| 4,797,216 A | 1/1989 | Hodge |
| 5,211,859 A | 5/1993 | Horton et al. |
| 7,001,872 B2 | 2/2006 | Pyecroft et al. |
| 7,265,079 B2 | 9/2007 | Willberg et al. |
| 7,527,102 B2 | 5/2009 | Crews et al. |
| 8,230,925 B2 | 7/2012 | Willberg et al. |
| 8,371,383 B2 | 2/2013 | Bell et al. |
| 2006/0018968 A1 | 1/2006 | Melbouci |

(Continued)

OTHER PUBLICATIONS

International Searching Authority, International Search Report and Written Opinion, PCT Application No. PCT/US2014/051596, Nov. 21, 2014.

*Primary Examiner* — Doug Hutton, Jr.
*Assistant Examiner* — Ashish Varma
(74) *Attorney, Agent, or Firm* — Parsons Behle & Latimer

(57) ABSTRACT

A well treatment method includes forming a well treatment fluid by combining ingredients including a polymer, a crosslinker, an acidifying substance, and a base fluid. Crosslinking increases viscosity of the fluid during a development time. A pH decrease is controlled during the development time using the acidifying substance. The method also includes delaying the development time of the viscosity increase by controlling the pH decrease. A well treatment method includes forming a well treatment fluid by combining ingredients including a hydratable polymer, a crosslinker, an acidifying substance, and a base fluid. The method includes delaying development time of a viscosity increase by controlling a pH decrease without adding further acidifying substance after combining the polymer, crosslinker, acidifying substance, and base fluid. A well treatment fluid formulated with ingredients include a base fluid, a polymer, a crosslinker, and an acidifying substance. The acidifying substance is configured to delay development time.

20 Claims, 5 Drawing Sheets

(56) References Cited

U.S. PATENT DOCUMENTS

| | | |
|---|---|---|
| 2008/0176770 A1* | 7/2008 | Sanders ................. C09K 8/524 |
| | | 507/213 |
| 2008/0234147 A1 | 9/2008 | Li et al. |
| 2009/0247430 A1 | 10/2009 | Fu |
| 2011/0028354 A1 | 2/2011 | Le et al. |
| 2011/0146996 A1* | 6/2011 | Bell ....................... C09K 8/685 |
| | | 166/308.5 |
| 2011/0214860 A1 | 9/2011 | Tonmukayakul et al. |
| 2012/0247774 A1 | 10/2012 | Li et al. |
| 2012/0252707 A1* | 10/2012 | Li ........................... C09K 8/665 |
| | | 507/213 |
| 2012/0285692 A1 | 11/2012 | Potapenko et al. |
| 2012/0305245 A1 | 12/2012 | Loiseau et al. |
| 2013/0180713 A1 | 7/2013 | Patil et al. |

\* cited by examiner

DELAYED VISCOSITY WELL TREATMENT METHODS AND FLUIDS

TECHNICAL FIELD

Methods and compositions herein pertain to well treatment methods and fluids, such as those that include an acidifying substance that controls a pH decrease during a viscosity development time.

BACKGROUND

Wells drilled in low-permeability subterranean formations are often treated by reservoir stimulation techniques, such as hydraulic fracturing, to increase their conductivity and thereby enhance recovery of hydrocarbons. Treatment fluids are pumped at high pressure into the formation to create fractures in the formation. Proppants may be incorporated in the fluids to prop open the created fractures when the surface treating pressure is released. Hydrated polymers by themselves generally do not possess enough viscosity for proppant transport at temperatures encountered in the well. Thus, additional viscosity may be generated by crosslinking the polymers with crosslinkers, such as boron, zirconium, and titanium compounds. Examples of polymers known for use in reservoir stimulation include polysaccharides, such as guar gum or its derivatives, and cellulose derivatives. Derivatized guar and cellulose include carboxymethyl guar (CMG), hydroxypropyl guar (HPG), carboxymethylhydroxypropyl guar (CMHPG), carboxymethyl cellulose (CMC), hydroxyethyl cellulose (HEC), and carboxymethylhydroxyethyl cellulose (CMHEC).

Research and development has included finding viable alternatives to guar gum. Derivatized cellulose such as CMC, HEC, and CMHEC was identified as a guar alternative. One benefit of CMC, HEC and CMHEC is that they contain fewer insoluble residues, therefore, they are cleaner polymers and less damaging to the subterranean formation than guar-based polymers. CMC is less expensive than double derivatized CMHEC, both of which may crosslink at a low pH, such as no more than about 6.8, using crosslinkers with transition metals, such as zirconium. One disadvantage of known low pH crosslinking fracturing fluid based on CMG, CMHPG, CMC, or CMHEC is rapid or non-delayed viscosity development, which generates pipe friction pressure during pumping and results in mechanical shearing of the fluid. Accordingly, fluids with other viscosity development characteristics are desirable.

SUMMARY

A well treatment method includes forming a well treatment fluid by combining ingredients including a polymer, a crosslinker, an acidifying substance, and a base fluid that is not crosslinked. The method includes crosslinking the polymer in the base fluid using the crosslinker. The crosslinking increases viscosity of the well treatment fluid during a development time after combining the polymer, crosslinker, acidifying substance, and base fluid. A pH decrease is controlled during the development time in the well treatment fluid using the acidifying substance. The method also includes delaying the development time of the viscosity increase by controlling the pH decrease. A well is treated with the well treatment fluid exhibiting the increased viscosity.

A well treatment method includes forming a well treatment fluid by combining ingredients including a hydratable polymer, a crosslinker, an acidifying substance, and a base fluid. The method includes hydrating the polymer using the base fluid and crosslinking the hydrated polymer in the base fluid using the crosslinker. The crosslinking increases viscosity of the well treatment fluid during a development time after combining the polymer, crosslinker, acidifying substance, and base fluid. A pH decrease is controlled during the development time in the well treatment fluid using the acidifying substance. The method includes delaying the development time of the viscosity increase by controlling the pH decrease without adding further acidifying substance after combining the polymer, crosslinker, acidifying substance, and base fluid. The well treatment fluid is introduced into a well. Control of the pH decrease continues in the well for the development time after combining the polymer, crosslinker, acidifying substance, and base fluid. A subterranean formation is fractured using the well treatment fluid exhibiting the increased viscosity.

A well treatment fluid formulated with ingredients include a base fluid, a polymer, a crosslinker, and an acidifying substance. The polymer and crosslinker are configured, in combination, to crosslink the polymer in the base fluid and to increase viscosity in the well treatment fluid during a development time after combining the polymer, crosslinker, acidifying substance, and base fluid. The acidifying substance is configured to control a pH decrease during the development time in the well treatment fluid and to delay the development time of the viscosity increase.

BRIEF DESCRIPTION OF THE DRAWINGS

Some embodiments are described below with reference to the following accompanying drawings.

DETAILED DESCRIPTION

Figure 1:
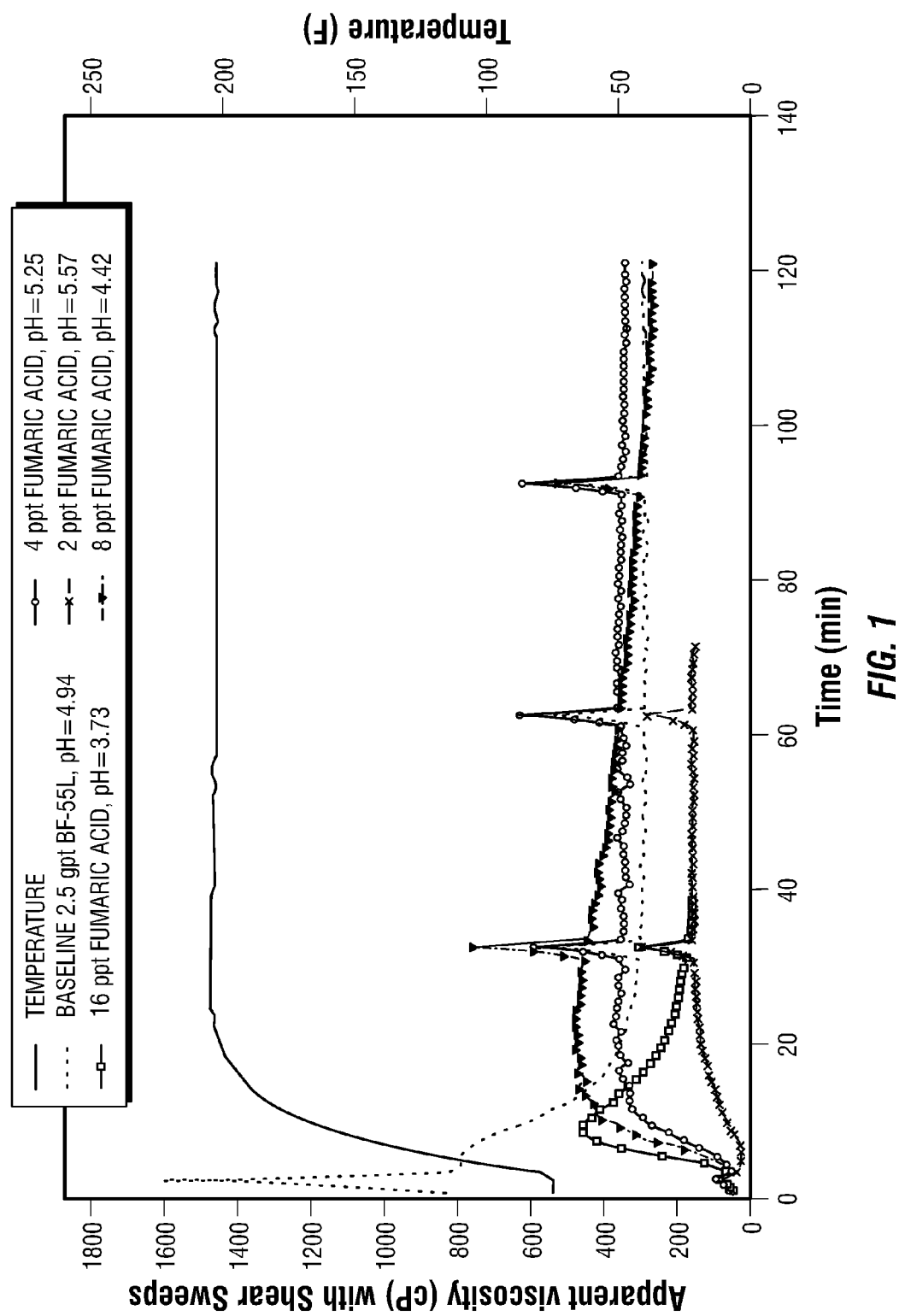
FIGS. 1 and 2 are rheology profile graphs for CMC at 30 and 40 pounds per thousand gallons (ppt), respectively, using various concentrations of solid fumaric acid.

Chemical methods of delaying crosslinking of CMG, CMHPG, CMC, or CMHEC used for fracturing applications at low pH, such as no more than about 6.8, are often not effective. Delaying compounds in the crosslinker often lose chelating ability due to protonation of anionic binding sites at low pH. The ability to effectively control viscosity development with low pH fracturing fluid may increase the applicability and acceptability of CMG, CMHPG, CMC, or CMHEC based fracturing fluids.

In one embodiment, a well treatment method includes forming a well treatment fluid by combining ingredients including a polymer, a crosslinker, an acidifying substance, and a base fluid that is not crosslinked. The method includes crosslinking the polymer in the base fluid using the crosslinker. The crosslinking increases viscosity of the well treatment fluid during a development time after combining the polymer, crosslinker, acidifying substance, and base fluid. A pH decrease is controlled during the development time in the well treatment fluid using the acidifying substance. The method also includes delaying the development time of the viscosity increase by controlling the pH decrease. A well is treated with the well treatment fluid exhibiting the increased viscosity.

By way of example, the polymer may include hydratable, derivatized guar or cellulose, CMG, HPG, CMHPG, CMC, CMHEC, or synthetic polymer, but especially CMHPG, CMG, CMC, or CMHEC. The base fluid may be water, a linear gel, or some other aqueous-based fluid. Linear gel is known as a fluid that contains polymer and exhibits a higher viscosity than water, but is not crosslinked. The method may further include hydrating the polymer using the base fluid. That is, prior to combining the ingredients, the polymer is not hydrated and hydration is accomplished by the base fluid that forms the well treatment fluid. The polymer may be hydrated using the base fluid prior to the crosslinking. Crosslinkers may be metallic-based crosslinkers configured for applications with a pH no more than about 6.8, for example, in the range of about 3.0 to about 6.8. Examples include zirconium, titanium, aluminum, chromium, or iron crosslinkers.

The acidifying substance may include a water-soluble solid acid, a water-soluble liquid acid, a latent acid, or an acid-generating compound. As the term is used herein, "water-soluble" substances are those exhibiting a solubility and/or rate of dissolution sufficient to accomplish the purposes of the embodiments herein. For example, as in the present well treatment method, solubility and/or rate of dissolution may be sufficient to control pH decrease during the viscosity development. "Solubility" refers to the amount of a substance that dissolves to an equilibrium state in a given amount of a solvent and may be affected by temperature and chemical properties of the substance and the solvent. "Rate of dissolution" refers to the rate at which such dissolving occurs and may be affected by several additional factors, including saturation of the solvent, mixing, surface area of the dissolving substance, etc.

Water solubility of the acidifying substance may be relatively low, such as less than or equal to about 135 gram (g) per 100 milliliter (mL) at 20° Celsius (C), including from about 0.20 to about 8.0 g/100 mL. Often, low solubility parallels slow rate of dissolution. Even so, measures may be taken, such as described herein, to decrease rate of dissolution for an otherwise more soluble material. Low solubility and/or slow dissolution may be suitable provided the purposes of the embodiments herein are not frustrated. Indeed, as appreciated from the further discussion below, acidifying substances that dissolve too fast may frustrate pH control during viscosity development. One example of a sufficiently water-soluble solid acid includes fumaric acid available in various particle sizes, even though fumaric acid does not immediately dissolve in water. Fumaric acid exhibits a solubility of about 0.63 g/100 mL at 20° C. The acidifying substance may include a water-soluble solid acid, such as fumaric acid, slurried in a hydrocarbon liquid.

Working with solid acid in the field might complicate mixing operations and handling safety, as well as inhibit uniform distribution of solid acid in the well treatment fluid. Accordingly, a slurry of the solid acid may simplify mixing operations, increase handling safety, and facilitate uniform distribution in the well treatment fluid. Use of the slurry allows for introducing the solid acid with a metering pump. Additionally, placing the water-soluble solid acid in a liquid that is less water-soluble may provide a further delay in development time. The liquid may present an obstacle to dissolution in the base fluid in addition to the solubility obstacle of the solid acid itself. Examples of suitable liquids include hydrocarbon, non-diesel oil, mineral oil, etc.

The acidifying substance may exhibit increased solubility in water at increasing temperatures above 75° F. That is, solubility of solid acid, or other acidifying substance, may increase in the well as temperature increases with well depth compared to solubility upon combining ingredients at the surface. The increased solubility at increasing temperatures allows the acidifying substance to dissolve into water and adjust the system pH to the desirable range and facilitate the subsequent crosslinking. Before introducing the well treatment fluid into the well, solubility of the solid acid may be less with a corresponding delay in development time compared to more solubility at depth with correspondingly less development time. In this manner, well treatment fluid may be placed at a desired well depth without full development of viscosity during pumping to reduce the tubular friction and yet reach full viscosity before the fluid enters fractures to provide sufficient proppant suspension and transportation.

Additional water-soluble solid acids that may be used include maleic acid, oxalic acid, malonic acid (propanedioc acid), succinic acid (butanedioc acid), adipic acid, benzoic acid, tartaric acid, ortho-tolulic acid, benzene tetracarboxylic acid, citric acid, mandelic acid, gluconic acid, and combinations thereof. Water-soluble liquid acids that may be used include acrylic acid, propanoic acid, butanoic acid, pentanoic acid (valeric acid), hexanoic acid, octanoic acid, nonanoic acid, and combinations thereof. Although liquid acids may be at least somewhat water-soluble, their water solubility and/or dissolution rate may be low enough that they can provide the described delay in development time in an analogous manner to a solid acid. Liquid acid water solubility may also increase with increasing temperatures above 75° F.

A latent acid, which reacts in water to produce an acid, may also operate to control a pH decrease during the development time, depending on the kinetics of the hydrolysis reaction. Some latent acids may hydrolyze too quickly to produce a useful length of delay. Examples of latent acids include esters and benzyl halides. Similarly, some other acid-generating compound, which may generate acid depending on conditions experienced in the well treatment fluid, may control the pH decrease. Benzyl halide, such as benzyl chloride, benzyl dichloride, or benzyl trichloride, may react at increasing temperatures experienced in the well to hydrolyze to benzyl alcohol, benzaldehyde, or benzoic acid, respectively, producing hydrochloric acid. Reaction mechanisms other than hydrolysis are conceivable for the acid-generating compound.

As appreciated from the various acidifying substances discussed above, controlling the pH may include controlling solubility and/or dissolution rate of the acidifying substance. Alternatively, or in addition, controlling the pH may include controlling generation of acid from the acidifying substance. Controlling solubility and/or dissolution rate for a solid acid may be affected by solubility of the solid acid itself, solubility of a composition functioning as a carrier, encapsulant, etc. of the solid acid, particle size of the solid acid, etc. Controlling solubility for a liquid acid may be affected mostly by solubility of the liquid itself. In comparison, controlling generation of acid may be affected by temperature, pressure, and other process conditions or chemical compositions to which the acidifying substance is exposed.

In either circumstance, the delay in development time may occur without adding further acidifying substance after combining the polymer, crosslinker, acidifying substance, and base fluid. That is, the polymer, crosslinker, acidifying substance, and base fluid may be combined and, once combined, the pH decrease control takes effect based on the combined ingredients themselves. Delay in viscosity development time occurs without later adding acidifying substance to the combined ingredients.

As an example, the development time may be at least one minute, such as, at least two or at least three minutes, including greater than ten minutes. Viscosity development time may be determined by a vortex closure test. In summary, vortex closure may be defined as the time taken for a vortex formed by linear gel in a blender, such as a WARING™ blender (Waring Commercial, Torrington, Conn.), to close after injection of crosslinking additives and other ingredients of interest. Viscosity development time may thus be selected as the time to vortex closure exhibited by the well treatment fluid.

A continuous increase in viscosity may occur after vortex closure and may accelerate due to a faster release of metal ion of the crosslinker with increased temperature, such as under downhole conditions. Consequently, a time to peak viscosity might be reached after vortex closure time. As a result, some milestone after vortex closure might be selected as the viscosity development time, depending on the type of the treatment used in a well treatment method and the viscous properties desired.

One example of a test method for determining vortex closure time includes American Petroleum Institute Recommended Practice (API RP-39) "Recommended Practices on Measuring the Viscous Properties of a Cross-Linked Water-Based Fracturing Fluid." Viscous properties might be further characterized, as in API RP-39, by a crown time that occurs after vortex closure time. Thus, viscosity development time might be specified as the crown time exhibited by the well treatment fluid.

For a hydraulic fracturing fluid, and perhaps other fluids, the most relevant viscosity development time to consider may be the vortex closure or crown time. It is conceivable that the fluid may exhibit a practically instantaneous vortex closure or crown time. The vortex closure or crown time may otherwise be so short as not to provide any useful delay within the purposes of the methods and compositions described herein, such as for placement of hydraulic fracturing fluid in a well. Accordingly, in the methods and compositions herein, the vortex closure may be at least one minute, such as, at least two or at least three minutes, including greater than ten minutes. Instead or in addition, the crown time may be at least two minutes, such as, at least three minutes, including greater than ten minutes. Increasing viscosity may continue thereafter.

The development time of the viscosity may increase by controlling the pH decrease. Thus, the viscosity development delay may be greater than the delay that would otherwise occur without controlling the pH decrease during development time. As an example, pH may begin at greater than 8 upon combining the polymer, crosslinker, acidifying substance, and base fluid followed by pH decreasing to about 3.0 to about 6.8 during the development time. The pH may remain at about 3.0 to about 6.8 for completion of crosslinking. That delay in viscosity development time may then be greater than a delay, if any, that occurs where pH begins at and is maintained at about 3.0 to about 6.8 from the time the polymer, crosslinker, acidifying substance, and base fluid are combined.

The method may further include introducing the well treatment fluid into the well. The control of the pH decrease may continue in the well for the development time after combining the polymer, crosslinker, acidifying substance, and base fluid. The method may include stimulating a subterranean formation, such as by hydraulic fracturing, using the well treatment fluid.

In more detail, according to another embodiment, a well treatment method includes forming a well treatment fluid by combining ingredients including a hydratable polymer, a crosslinker, an acidifying substance, and a base fluid. The method includes hydrating the polymer using the base fluid and crosslinking the hydrated polymer in the base fluid using the crosslinker. The crosslinking increases viscosity of the well treatment fluid during a development time after combining the polymer, crosslinker, acidifying substance, and base fluid. A pH decrease is controlled during the development time in the well treatment fluid using the acidifying substance. The method includes delaying the development time of the viscosity increase by controlling the pH decrease without adding further acidifying substance after combining the polymer, crosslinker, acidifying substance, and base fluid. The well treatment fluid is introduced into a well. Control of the pH decrease continues in the well for the development time after combining the polymer, crosslinker, acidifying substance, and base fluid. A subterranean formation is fractured using the well treatment fluid exhibiting the increased viscosity.

By way of example, the acidifying substance may include a water-soluble solid acid, a water-soluble liquid acid, a latent acid, or an acid-generating compound. The acidifying substance may exhibit increased solubility in water at increasing temperatures above 75° F. As discussed above for another embodiment, solubility and/or rate of dissolution of the acidifying substance may be sufficient to control pH decrease during the viscosity development. The base fluid may be water, a linear gel, or some other aqueous-based fluid.

In a further embodiment, a well treatment fluid formulated with ingredients includes a base fluid, a polymer, a crosslinker, and an acidifying substance. The polymer and crosslinker are configured, in combination, to crosslink the polymer in the base fluid and to increase viscosity in the well treatment fluid during a development time after combining the polymer, crosslinker, acidifying substance, and base fluid. The acidifying substance is configured to control a pH decrease during the development time in the well treatment fluid and to delay the development time of the viscosity increase.

By way of example, the polymer may include CMG, HPG, CMHPG, CMC, or CMHEC. The acidifying substance may include a water-soluble solid acid, a water-soluble liquid acid, a latent acid, or an acid-generating compound. The acidifying substance may include a water-soluble solid acid slurried in a hydrocarbon liquid. Also, the acidifying substance may exhibit increased solubility in water at increasing temperatures above 75° F. As discussed above for another embodiment, solubility and/or rate of dissolution of the acidifying substance may be sufficient to control pH decrease during the viscosity development. The base fluid may be water, a linear gel, or some other aqueous-based fluid. The well treatment fluid may further include one or more ingredients selected from the group consisting of proppant and clay control agents Example 1

Figure 6:
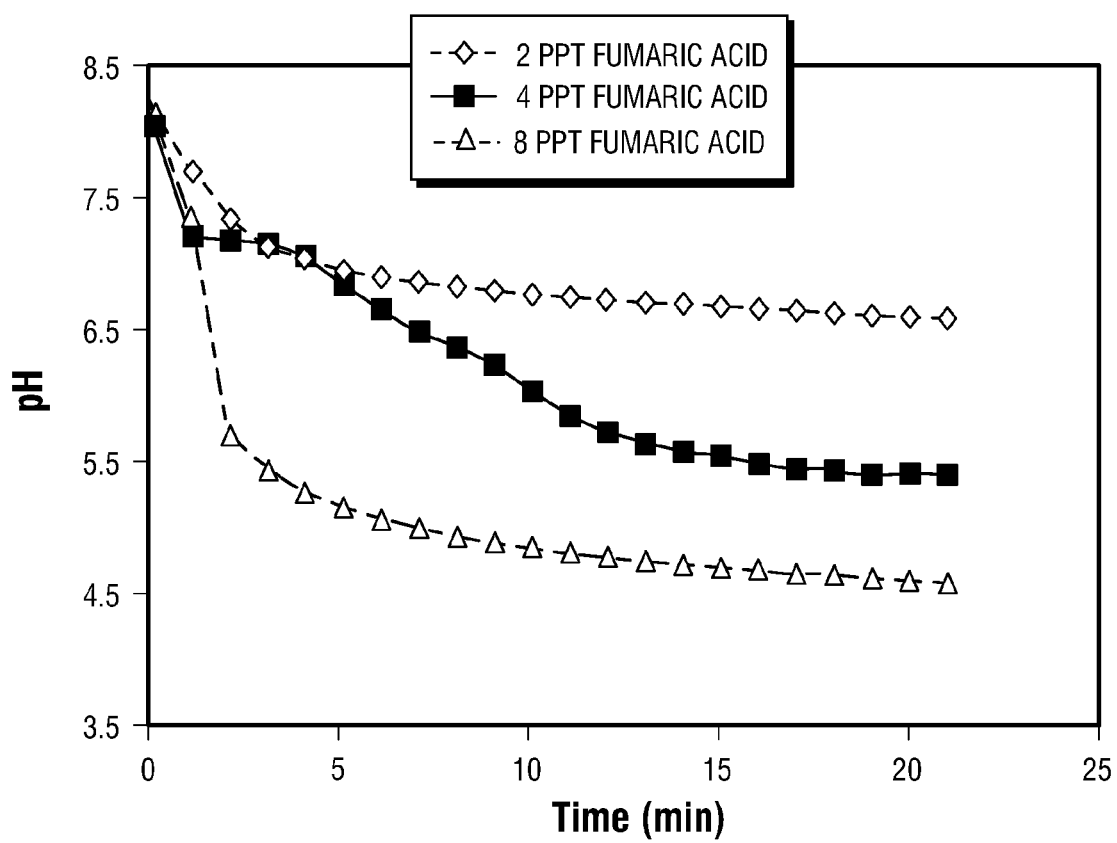
FIG. 6 is a graph of pH over time for CMC at 30 ppt using various concentrations of solid fumaric acid.

CMC was hydrated in Tomball, Tex. municipal water at 30 ppt and solid 100% fumaric acid powder was combined with 3.0 gpt XLW-22C zirconium-based crosslinker available from Baker Hughes, Inc. in Houston, Tex. Fumaric acid loading was varied from 2 to 16 ppt obtaining pH values that ranged from 3.73 to 5.57 (as indicated in the legend of FIG. 1) after the controlled pH decrease during development time. The higher loadings of fumaric acid produced the lower ultimate pH values. As shown in FIG. 6, higher loadings of fumaric acid with 30 ppt CMC hydrated in Tomball water also produce a faster drop in pH over time at room temperature. The faster drop in pH decreases viscosity development time, such as vortex closure time.

For a baseline comparison, FIG. 1 shows a rheology profile for 2.5 gpt of BF-55L, instead of the fumaric acid, producing a pH of 4.94. BF-55L is an acid buffer available from Baker Hughes, Inc.

The FIG. 1 baseline composition at pH 4.94 did not yield any delay in viscosity development (vortex closure time of 0-3 seconds) after combining ingredients. Instead, initial viscosity was about 800 cP. The fumaric acid compositions, on the other hand, demonstrated viscosity development delay as indicated by the rheology data of FIG. 1 with starting viscosity well below 200 cP. As shown in FIG. 1, the later time rheology of the delayed crosslinked fluid is better than the non-delayed crosslinked fluid due to reduced shearing damage as a result of delayed viscosity development. The high spikes in viscosity in rheology tests are caused by shear ramps during the measurements at about 0, 30, 60, and 90 min.

Table 1 using the fluids prepared for FIG. 1 shows the vortex closure and crown times produced from API RP 39 (see above). In general, increased vortex closure and crown times indicated a delayed development time of the viscosity increase produced by controlling the pH decrease. In comparison, the baseline fluid exhibited a vortex closure of about 0 to 3 seconds (sec.). The increased vortex closure and crown times were obtained even where pH in the fumaric acid compositions was ultimately less (3.73 and 4.42) than the baseline composition pH (4.94).

TABLE 1

| Fumaric Acid (ppt) | Vortex Closure (sec.) | Crown Time (sec.) | Fluid pH |
| --- | --- | --- | --- |
| 2 | 510 | >600 | 5.57 |
| 4 | 264 | 322 | 5.25 |
| 8 | 180 | 182 | 4.42 |
| 16 | 97 | 114 | 3.73 |

Example 2

Figure 2:
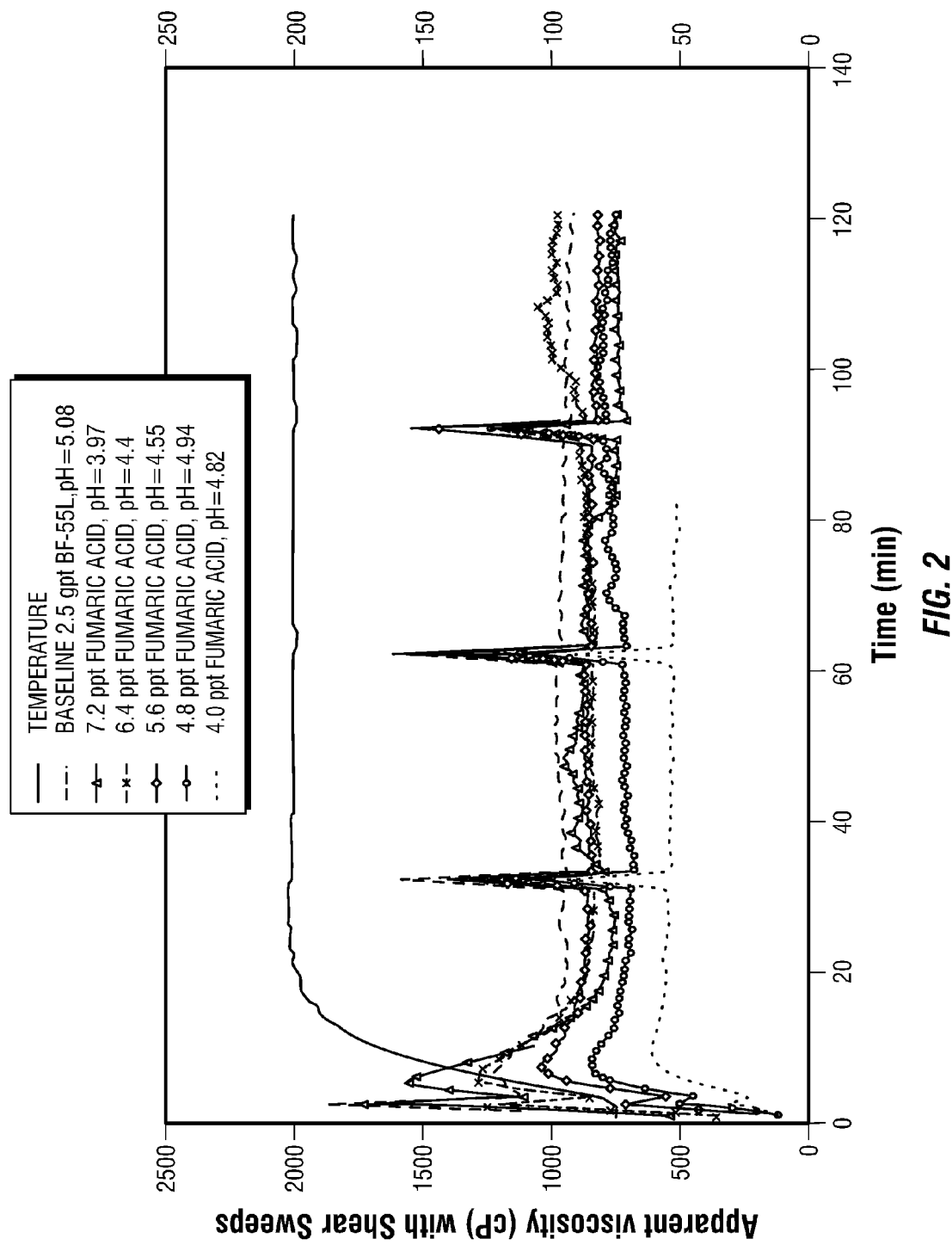

Example 1 was repeated use 40 ppt CMC. The FIG. 2 baseline composition at pH 5.08 did not yield any delay. Initial viscosity from the rheology data for the baseline composition was well over a 1000 cP. However, the fumaric acid compositions provided delayed viscosity development with starting viscosity in the range of 100-300 cP. The high spikes in viscosity are caused by shear sweeps during the measurements at about 0, 30, 60, and 90 min.

Example 3

Figure 3:
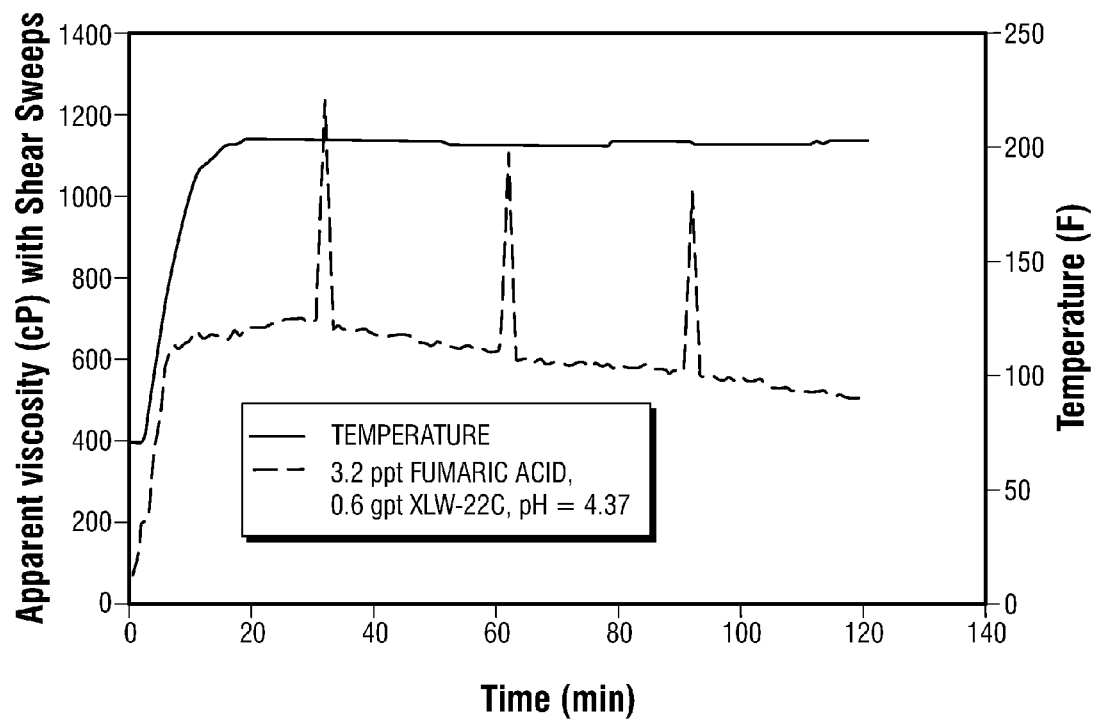
FIG. 3 is a rheology profile graph for CMHPG at 30 ppt using 3.2 ppt of solid fumaric acid.

Example 1 was repeated using 30 ppt CMHPG instead of CMC and 0.6 gpt XLW-22C crosslinker. Results are shown in FIG. 3 for 3.2 ppt fumaric acid demonstrating delayed viscosity development.

Example 4

A slurry of fumaric acid was prepared in non-diesel oil containing other additives such as clay and surfactant to aid suspension of the acid in the mixture. The slurry contained a) 61.4 weight % (wt %) ODC Oil (non-diesel) available from PFP Technology in Houston, Tex., b) 1.38 wt % PSA-5 clay suspension agent available from Baker Hughes, Inc., c) 0.47 wt % PSA-65L surfactant available from Baker Hughes, Inc. and d) 36.8 wt % fumaric acid. About 40.02 grams (g) (50 milliLiters (mL)) of ODC oil was weighed into a 125 mL jar. Then 0.901 g of PSA-5 was added into the jar, stirred for 10 minutes, accompanied by 0.3036 g of PSA-65L and another 20 minutes of vigorous stirring. 23.96 g of fumaric acid was added into the mixture and stirred for another 30 minutes to obtain a slurry of the acid. The fumaric acid concentration was 0.48 g/mL.

Figure 4:
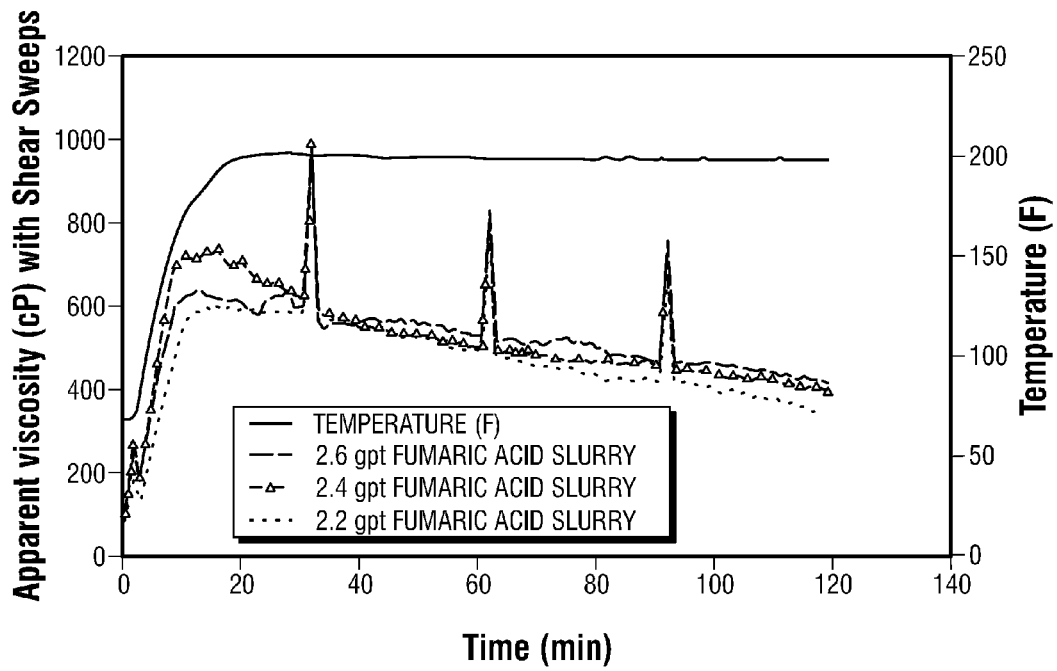
FIG. 4 is a rheology profile graph for CMC at a 40 ppt using various concentrations of a hydrocarbon slurry containing solid fumaric acid.

The fumaric acid slurry was substituted for the fumaric acid of Example 2. FIG. 4 shows the delay in development time for 40 ppt CMC polymer with 3.2 gpt XLW-22C crosslinker. The corresponding vortex closure time of the fluids prepared for FIG. 4 were 130 to 140 seconds for a corresponding pH of the fluid ranging from 3.83 to 4.11.

Example 5

Figure 5:
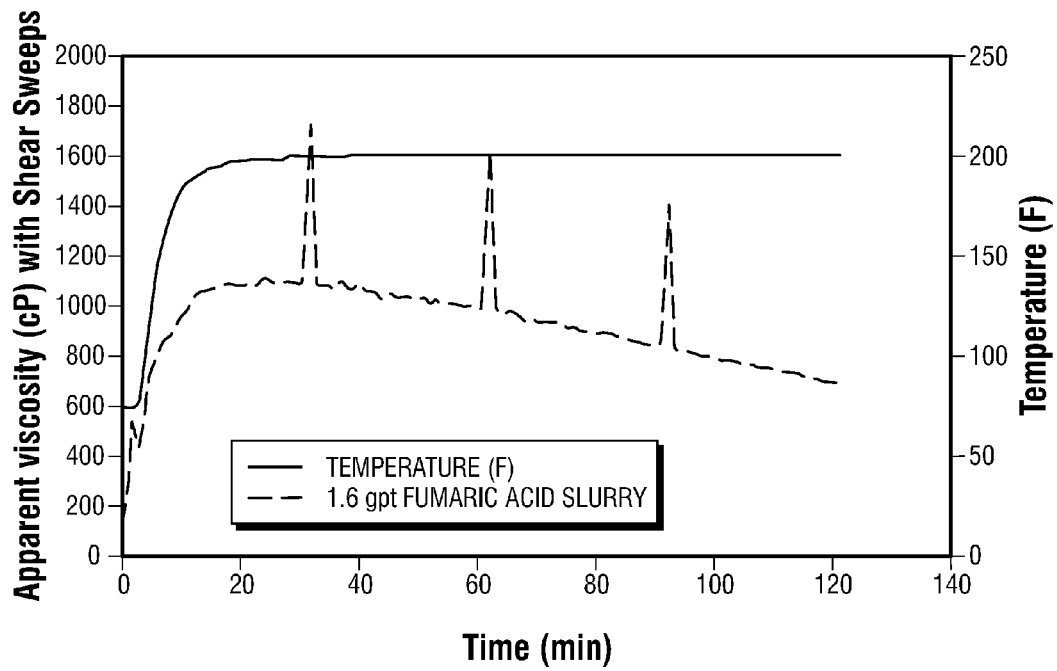
FIG. 5 is a rheology profile graph for CMHPG at 30 ppt using 1.6 gpt of a hydrocarbon slurry containing solid fumaric acid.

The fumaric acid slurry of Example 4 was substituted for the fumaric acid of Example 3. FIG. 5 shows the delay in development time for 30 ppt CMHPG polymer with 0.8 gpt XLW-22C crosslinker. The final pH of the fluid was 3.87 exhibiting a vortex closure time of 71 seconds.

Example 6

Varying amounts of the fumaric acid slurry of Example 4 were placed in a bottle with 100 mL of deionized water and dissolution of the solid fumaric acid in the slurry was observed over time. Table 2 shows the observations and demonstrates that a longer delay could be achieved by adding fumaric acid in a hydrocarbon slurry. At 36.8 wt %, the 1.710 g sample contained 0.63 g fumaric acid. Even though fumaric acid exhibits a solubility of 0.63 g/100 mL, the oil in the slurry decreased the solubility and/or extended the rate of dissolution of fumaric acid such that it was not fully dissolved after 24 hours. Rate of dissolution of the fumaric acid in the slurry was between 0.252 (0.686×0.368) and 0.377 (1.024×0.368) g/100 mL in 24 hours.

TABLE 2

| Acid Slurry weight (g) | Solubility (visual) at 20° C. | | pH | |
| --- | --- | --- | --- | --- |
| | 15 min. | 24 hours | 15 min. | 24 hours |
| 0.119 | No solid | | 3.65 | 2.91 |
| 0.154 | found at the | | 3.65 | 2.93 |
| 0.365 | bottom | | 2.96 | 2.90 |
| 0.686 | Still some | No solid | 2.74 | 2.32 |
| 1.024 | solid in the | Yes, solid | 2.55 | 2.31 |
| 1.710 | bottom | Yes, solid | 2.35 | 2.30 |

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A well treatment method comprising:
    forming a well treatment fluid by combining ingredients including a polymer, a crosslinker, an acidifying substance, and a base fluid that is not cross-linked;
    crosslinking the polymer in the base fluid using the crosslinker, the crosslinking increasing viscosity of the well treatment fluid during a development time of a viscosity increase after combining the polymer, crosslinker, acidifying substance, and base fluid;
    decreasing pH and controlling the pH decrease during the development time of the viscosity increase in the well treatment fluid using the acidifying substance, the pH decrease facilitating the crosslinking that uses the crosslinker;
    delaying the development time of the viscosity increase by controlling the pH decrease during the development time; and
    treating a well with the well treatment fluid exhibiting the increased viscosity.

2. The method of claim 1 wherein the polymer comprises hydratable, derivatized guar or cellulose, CMG, HPG, CMHPG, CMC, CMHEC, or synthetic polymer and the method further comprises hydrating the polymer using the base fluid.

3. The method of claim 1 wherein the acidifying substance comprises a water-soluble solid acid, a water-soluble liquid acid, a latent acid, or an acid-generating compound.

4. The method of claim 1 wherein the acidifying substance comprises a water-soluble solid acid slurried in a hydrocarbon liquid.

5. The method of claim 1 wherein the acidifying substance exhibits increased solubility in water at increasing temperatures above 75° F.

6. The method of claim 1 wherein the acidifying substance comprises solid fumaric acid.

7. The method of claim 1 wherein controlling the pH comprises controlling solubility and/or dissolution rate of the acidifying substance and delaying the viscosity development time occurs without adding further acidifying substance after combining the polymer, crosslinker, acidifying substance, and base fluid.

8. The method of claim 1 wherein controlling the pH comprises controlling generation of acid from the acidifying substance and delaying the viscosity development time occurs without adding further acidifying substance after combining the polymer, crosslinker, acidifying substance, and base fluid.

9. The method of claim 1 wherein the development time is at least one minute.

10. The method of claim 1 further comprising introducing the well treatment fluid into the well, control of the pH decrease continuing in the well for the development time after combining the polymer, crosslinker, acidifying substance, and base fluid.

11. The method of claim 1 further comprising fracturing a subterranean formation using the well treatment fluid.

12. A well treatment method comprising:
    forming a well treatment fluid by combining ingredients including a hydratable polymer, a crosslinker, an acidifying substance, and a base fluid;
    hydrating the polymer using the base fluid;
    crosslinking the hydrated polymer in the base fluid using the crosslinker, the crosslinking increasing viscosity of the well treatment fluid during a development time of a viscosity increase after combining the polymer, crosslinker, acidifying substance, and base fluid;
    decreasing pH and controlling the pH decrease during the development time of the viscosity increase in the well treatment fluid using the acidifying substance, the pH decrease facilitating the crosslinking that uses the crosslinker;
    delaying the development time of the viscosity increase by controlling the pH decrease without adding further acidifying substance after combining the polymer, crosslinker, acidifying substance, and base fluid;
    introducing the well treatment fluid into a well, control of the pH decrease continuing in the well for the development time after combining the polymer, crosslinker, acidifying substance, and base fluid; and
    fracturing a subterranean formation using the well treatment fluid exhibiting the increased viscosity.

13. The method of claim 12 wherein the acidifying substance comprises a water-soluble solid acid, a water-soluble liquid acid, a latent acid, or an acid-generating compound.

14. The method of claim 12 wherein the acidifying substance exhibits increased solubility in water at increasing temperatures above 75° F.

15. The method of claim 1 wherein the ingredients further comprise one or more ingredients selected from the group consisting of proppant and clay control agents.

16. The method of claim 12 wherein the crosslinking occurs at a pH no more than 6.8.

17. The method of claim 1 wherein the crosslinking occurs at a pH no more than 6.8.

18. The method of claim 1 wherein the viscosity during the treating of the well is greater than 100 cP.

19. The method of claim 12 wherein the viscosity during the fracturing of the subterranean formation is greater than 200 cP.

20. The method of claim 16 wherein the development time is at least one minute.

* * * * *